United States Patent
Carini et al.

(10) Patent No.: US 6,897,851 B2
(45) Date of Patent: May 24, 2005

(54) METHODS AND APPARATUS FOR FORMATTED ENTRY OF ELECTRONIC INK

(75) Inventors: Paul Robert Carini, Sherman, CT (US); Paul Turquand Keyser, Mount Kisco, NY (US); Michael Peter Perrone, Yorktown, NY (US); David A. Sawin, Durham, NC (US); Jeffrey S. Schaffer, Ridgefield, CT (US); Jayashree Subrahmonia, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 409 days.

(21) Appl. No.: 09/755,787

(22) Filed: Jan. 5, 2001

(65) Prior Publication Data

US 2002/0088651 A1 Jul. 11, 2002

(51) Int. Cl.[7] ................................................. G09G 5/00
(52) U.S. Cl. ..................................................... 345/173
(58) Field of Search ................................. 345/173, 179; 178/18.01, 18.03; 382/175, 176, 177, 179, 186, 187, 188, 189; 707/505, 507

(56) References Cited

U.S. PATENT DOCUMENTS

| | | | |
|---|---|---|---|
| 5,627,349 A | | 5/1997 | Shetye et al. |
| 5,734,129 A | | 3/1998 | Belville et al. |
| 5,838,819 A | * | 11/1998 | Ruedisueli et al. .......... 382/187 |
| 5,921,582 A | * | 7/1999 | Gusack ......................... 283/67 |
| 6,144,371 A | * | 11/2000 | Clary et al. .................. 345/173 |
| 6,362,440 B1 | * | 3/2002 | Karidis et al. ........... 178/18.01 |
| 6,456,740 B1 | * | 9/2002 | Carini et al. ................. 382/187 |
| 6,504,956 B1 | * | 1/2003 | Gannage et al. ............ 382/188 |

* cited by examiner

Primary Examiner—Chanh Nguyen
(74) Attorney, Agent, or Firm—Thu Ann Dang; Ryan, Mason & Lewis, LLP (57) ABSTRACT

Several methods, and related apparatus, are provided for the entry of formatted ink data (i.e., electronic ink) such that individual items in the data may be parsed and recognized more effectively. Each method allows users to enter formatted ink data in-line, which can then be recognized with constraints and parsed for use in other application programs or databases. In addition, a method is provided for allowing user-specialization of any of these entry methods (or other similar) methods. Note that in any of these methods, the user may send the formatted ink either to the default ink-processing application, or else directly to another application or database.

42 Claims, 9 Drawing Sheets

- ELECTRONICALLY SELECT DESIRED LABEL TYPE — 72
- PLACE TEMPLATE CORRESPONDING TO SELECTED LABEL OVER DIGITIZER — 74
- FILL-IN DESIRED INFORMATION IN ACCORDANCE WITH FORMAT OF SELECTED TEMPLATE — 76
- ELECTRONICALLY INDICATE COMPLETION OF DATA ENTRY ON TEMPLATE — 78
- REMOVE TEMPLATE AND RETURN TO NORMAL FREE-FORM WRITING, IF SO DESIRED — 80

*FIG. 8*

| SUBJECT | DATE | PHONE | PRIORITY(Todo) |
|---|---|---|---|
| FIRST NAME | LAST NAME | START TIME | END TIME |

METHODS AND APPARATUS FOR FORMATTED ENTRY OF ELECTRONIC INK

FIELD OF THE INVENTION

The present invention relates generally to personal digital notepads and the like and, more particularly, to methods and apparatus for formatted entry of electronic ink in such personal digital notepads and the like.

BACKGROUND OF THE INVENTION

A personal digital notepad (PDN) is a digitizer-and-pen device that allows a writer to record handwritten information on a standard paper notepad, and simultaneously record an electronic carbon copy of the writing. The CrossPad marketed by the A.T. Cross Company and the IBM ThinkScribe are examples of PDNs. Such electronic ink collection devices have the requirement that when users wish to enter formatted data, i.e., "labeled ink," they must perform some action to signal that event. The term "formatted data" refers to data, such as an address, in which there are multiple items or parts; see below "Definitions." Furthermore, in most such cases, users desire or expect that the labeled ink will be recognized into text suitable for parsing and subsequent entry into some application program or database, such as a Personal Information Manager (PIM).

The existing methodology includes free-form entry of the data to be formatted "in-line," defined as follows. In this scenario, the user must: (1) write ink on whatever is the current page; and (2) give an electronic signal specifying which ink is to be labeled as formatted data. This is about as minimal a user-interface as can be imagined, but will usually require large amounts of post-processing, both on the recognition and the parsing. Because of this need for extensive post-processing, users may simply switch to their PIM or other application program and enter the data directly, without writing any ink at all. This is the scenario used with IBM's InkManager 2.0 and the CrossPad.

In other suggested scenarios for a write-on-paper device, such as IBM's ThinkScribe, the user-interface limitation is that the user is either asked to perform a large number of actions, some electronic and some physical, or else is asked to perform large amounts of post-processing.

In a third category of existing handwriting capturing methodologies, such as is described in U.S. Pat. No. 5,734,129 issued to Belville et al. on Mar. 31, 1998 and U.S. Pat. No. 5,627,349 issued to Shetye et al. on May 6, 1997, the only mode of data entry possible on the data entry device is formatted electronic ink data, i.e., the forms are completely predefined and completely occupy the writing area.

Thus, a need exists for methods and apparatus for performing entry of formatted electronic ink in accordance with handwriting systems, such as a PDN, which substantially minimize post-processing efforts, and do not prevent the entry of unformatted electronic ink.

SUMMARY OF THE INVENTION

The present invention provides several methods, and related apparatus, for the entry of formatted ink data (i.e., electronic ink) such that individual items in the data may be parsed and recognized more effectively. Each method allows users to enter formatted ink data in-line, i.e., without switching to another page, which can then be recognized with constraints and parsed for use in other application programs or databases. In addition, a method is provided for allowing user-specialization of any of these entry methods (or other similar) methods. Note that in any of these methods, the user may send the formatted ink either to the default ink-processing application, or else directly to another application or database.

In a first formatted ink data entry method according to the invention, referred to herein as "template-field entry," a separate page is provided for each type of formatted data to be entered, and users perform a sequence of three actions. First, the users select the type of formatted data they wish to enter; then, they place the appropriate type of page on their PDN and enter the data; and last, they signal completion.

In a second formatted ink data entry method according to the invention, referred to herein as "implicit-field entry," each page of the pad is printed with "watermark" style lines designating predefined fields. In this method, the users need only select the type of formatted data they wish to enter, then enter it in the appropriate fields, and last, signal completion. Note that all actions preferably take place on the current page.

In a third formatted ink data entry method according to the invention, referred to herein as "user-delineated-field entry," the users specify the type of formatted data they wish to enter; thereafter they specify the completion of each part of the formatted data; completion of the entry is implied by signaling the completion of the last part of the formatted data. Note that all actions preferably take place on the current page.

In a fourth formatted ink data entry method according to the invention, referred to herein as "tagged-field entry," the users write a word or symbol in the left (or right) margin in order to specify the type of formatted data they wish to enter, and then for each field being entered. Note that all actions preferably take place on the current page.

In a method according to the invention for allowing user-specialization of any of these or other similar methods, referred to herein as "user-specified field groupings," users are allowed to define their own (or to modify predefined) formattings for ink data entry. Note that all actions preferably take place on the current page.

These and other objects, features and advantages of the present invention will become apparent from the following detailed description of illustrative embodiments thereof, which is to be read in connection with the accompanying drawings.

DETAILED DESCRIPTION OF PREFERRED EMBODIMENTS

The present invention will be explained below in the context of an illustrative personal digital notepad architecture. However, it is to be understood that the present invention is not limited to any particular handwriting system architecture. Rather, the invention is more generally applicable to any handwriting system architecture in which it is desirable to provide one or more methods of entering electronic ink data so as to substantially minimize post-processing efforts.

Before presenting respective explanations of illustrative embodiments associated with the present invention, some definitions that may be used during the course of such explanations will first be provided below.

(i) Field: a delimited area or region on a page together with a specification of how ink written within that region is to be parsed and recognized.

(ii) Field Group: an ordered collection of Fields, specifying the parsing of labeled ink (see "Label" definition, below).

(iii) Formatted data: any electronic ink that is to be parsed in a Field Group; also the text-based data that results from the recognition of the formatted (ink) data.

(iv) Ink Data: set of ink strokes.

(v) Label: any electronic ink that, possibly after being recognized (in whole or part), is parsed for use in some application (including but not limited to databases or PIMs). "Labeled ink" is simply ink that is a Label. Labels come in a variety of types, including, but not limited to, "Appointments," "Contacts," "Todos," etc. It is to be understood that there may be two types of parsing: (i) parsing before recognition; and (ii) parsing after recognition. Parsing before recognition is parsing according to the Fields, while parsing after recognition would use text-based techniques to determine, e.g., that "Jul. 14, 2000" is a date but that "10:00 AM" is a time.

(vi) Recognition (and related terms): a handwriting recognition system, such as (but not limited to) that produced by IBM Corporation (and supplied with Ink-Manager 1.5).

Figure 1:
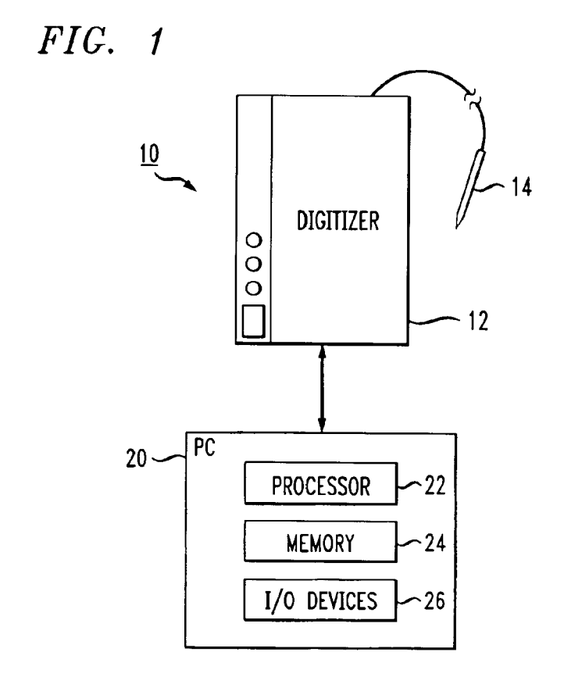
FIG. 1 is a block diagram illustrating a handwriting system in which the electronic ink formatted entry methodologies of the present invention may be employed.

Referring initially to FIG. 1, a block diagram is shown illustrating an overview of a system in which the electronic ink formatted entry methodologies of the present invention may be employed. As shown, the system may comprise a personal digital notepad (PDN) 10 which includes a digitizer 12 and a pen device 14. As mentioned, the PDN may, for example, be an IBM ThinkScribe or an A.T. Cross Company CrossPad. It is to be understood that while the pen 14 and digitizer 12 are shown as being connected via a cable, this is only an illustrative connection mechanism. That is, other connection mechanisms may be employed, e.g., a radio transmitter/receiver pair, etc. The invention is not limited to any particular connection mechanism. As is known, the physical paper for capturing the physical ink from the pen device is positioned over the digitizing surface of the digitizer which captures the so-called electronic ink or the electronic representation of the physical ink marks made on the physical paper by the pen device. Ink data collected by a PDN is recorded as a sequence of triplets (X, Y, T) corresponding to the horizontal position, the vertical position, and the timestamp, respectively, of the pen tip on the page. This is referred to as the "raw ink data."

The raw ink data may be sent to a personal computer (PC) 20 in the system, as shown in FIG. 1. Alternatively, as explained below, the PDN 10 may process the raw ink data in some manner before sending it to the PC 20. In any case, the PDN 10 and PC 20 may be connected via any suitable conventional communication link. The PC 20 may include a processor 22, memory 24, and I/O devices 26 such as, for example, a display, keyboard, etc. Also, as is known but not illustrated, the PDN may have its own processor, memory and I/O devices capable of implementing one or more of the operations described herein. The raw ink data may be processed by the PC in real-time or stored on the PDN and uploaded at the writer's convenience.

It is to be appreciated that the term "processor" as used herein is intended to include any processing device, such as, for example, one that includes a CPU (central processing unit) and/or other processing circuitry. The term "memory" as used herein is intended to include memory associated with a processor or CPU, such as, for example, RAM, ROM, a fixed memory device (e.g., hard drive), a removable memory device (e.g., diskette), flash memory, etc. In addition, the term "input/output devices" or "I/O devices" as used herein is intended to include, for example, one or more input devices, e.g., keyboard, pen or stylus, for entering data to the processing unit, and/or one or more output devices, e.g., CRT or other display, speaker and/or printer, for presenting results associated with the processing unit. It is also to be understood that the term "processor" may refer to more than one processing device and that various elements associated with a processing device may be shared by other processing devices. Accordingly, software components including instructions or code for performing the methodologies of the invention, as described herein, may be stored in one or more of the associated memory devices (e.g., ROM, fixed or removable memory) and, when ready to be utilized, loaded in part or in whole (e.g., into RAM) and executed by a CPU.

Figure 2:
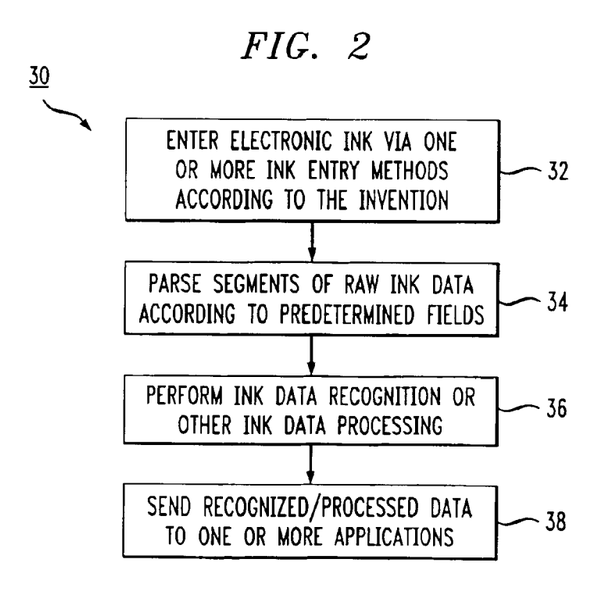
FIG. 2 is a flow diagram illustrating an overall process in which the electronic ink formatted entry methodologies of the present invention may be employed.

Referring now to FIG. 2, a flow diagram illustrates an overall process in which the electronic ink formatted entry methodologies of the present invention may be employed. As shown in the overall process 30, electronic ink is entered (step 32) via one or more of the formatted entry methodologies of the present invention, to be explained in detail below. It is to be appreciated that this step of the overall process is the primary focus of the present invention. It is the inventive entry methods described herein that substantially minimize the efforts associated with post-processing operations such as, for example, parsing and recognition.

Returning to the overall process 30, segments of such electronic ink or raw ink data are then parsed (step 34) according to predetermined fields associated with the entry method, to be explained below. Then, the parsed data is provided to a recognition system or other ink data processing operation (step 36). The recognized/processed ink data is then provided to one or more software applications, for example, a forms application (e.g., insurance), a PIM application (e.g., calendar), etc.

With respect to the PDN 10 and PC 20 illustrated in FIG. 1, it is to be understood that the electronic ink entry operation (step 32) is performed on the PDN 10. However, the parsing (step 34), recognition (step 36) and provision to one or more applications (step 38) may be performed on the PDN 10 or the PC 20. Alternatively, the operations can be shared by the processing capabilities of the PDN 10 and the PC 20. In fact, the software applications which receive the processed ink data may also reside and execute, in whole or in part, on either the PDN 10 or the PC 20. As mentioned above, the present invention is not intended to be limited to any particular hardware configuration.

Figure 3:
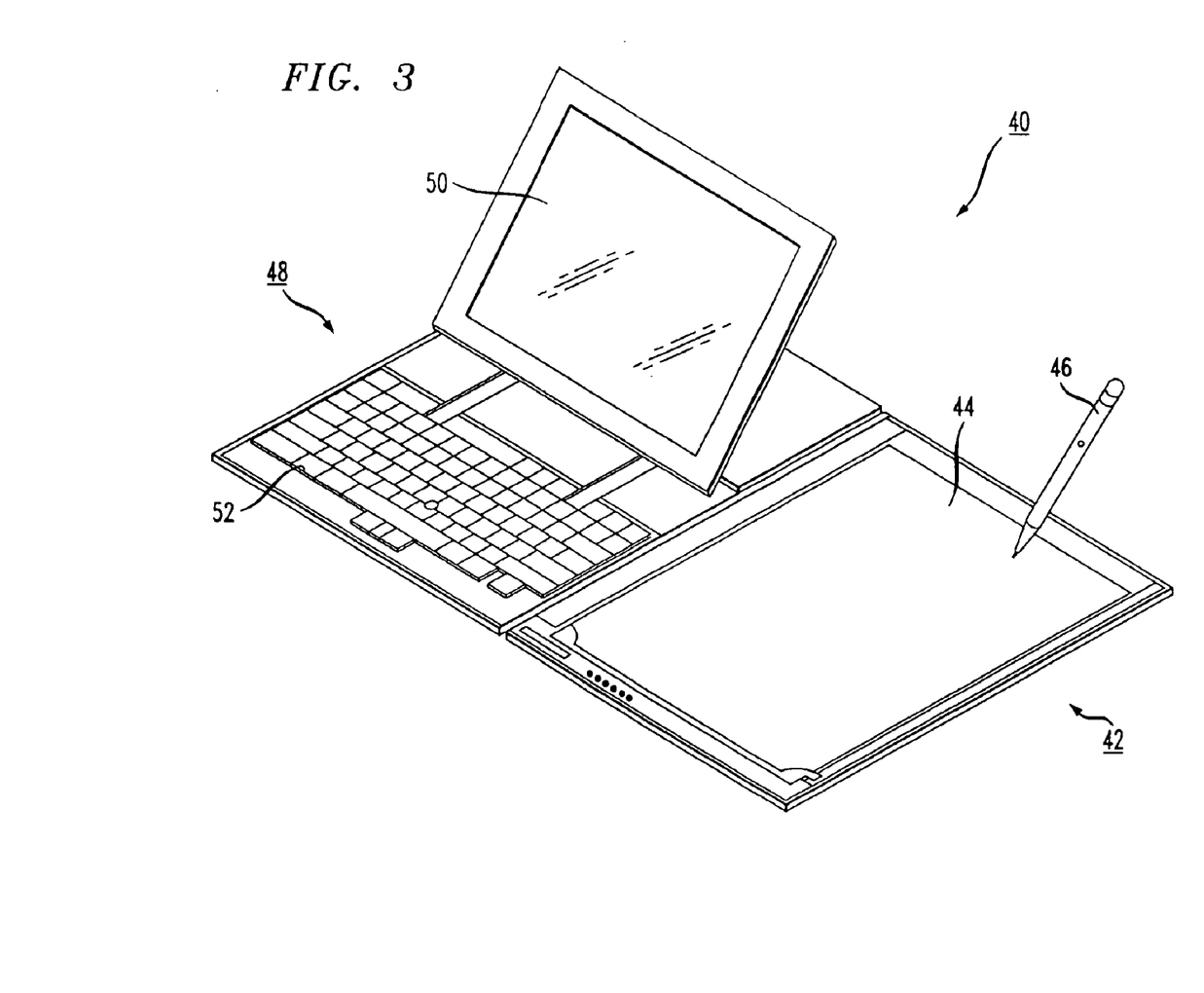
FIG. 3 is a perspective view illustrating a handwriting system in which the electronic ink formatted entry methodologies of the present invention may be employed.

Referring to FIG. 3, a perspective view illustrates one example of a handwriting system in which the electronic ink formatted entry methodologies of the present invention may be employed. The integrated system 40 comprises a PDN portion 42 with a digitizer 44 and pen device 46. Further, the integrated system comprises a PC portion 48, mechanically and electrically connected with the PDN 10, including processor (not shown), memory (not shown), and I/O devices such as a display 50 and a keyboard 52. Thus, the system provides a stand-alone electronic handwriting environment which may be used to enter electronic ink data according to the methodologies of the invention, post-process (e.g., parse, recognize) the entered ink data, and then run applications using the processed ink data. It is to be appreciated that the system shown in FIG. 3 is further described in a U.S. patent application identified as Ser. No. 09/070,391, filed on Apr. 30, 1998, and entitled: "Flexibly Interfaceable Port Computing Device," which claims priority to a U.S. provisional patent application identified as Ser. No. 60/079,745, filed on Mar. 27, 1998, and which is a parent application to a U.S. divisional patent application identified as Ser. No. 09/591,462, filed on Jun. 9, 2000, the disclosures of which are incorporated by reference herein.

In accordance with the present invention, a variety of electronic ink formatted entry methods (e.g., step 32 of FIG. 2) will now be described. The four illustrative methods are described in sequence, followed by a method for allowing user specialization of each of these (or any similar) method. Note also that elements of any of the four methods may be combined to create an alternative method intended to be within the scope of the present invention, e.g., template-field entry could be combined with user-delineated field entry, etc.

A. Template-field Entry

Figure 4:
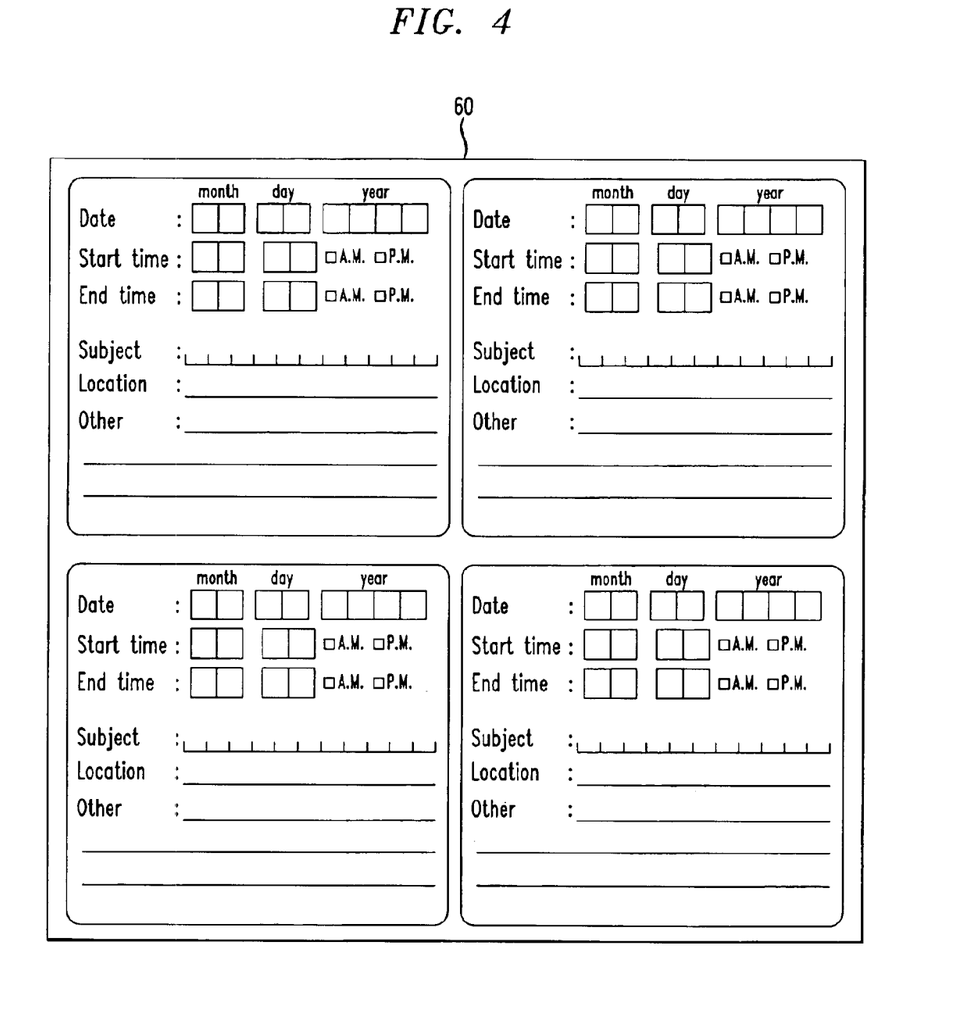
FIG. 4 is a diagram illustrating an appointments template for use with a template-field entry methodology according to an embodiment of the present invention.
Figure 5:
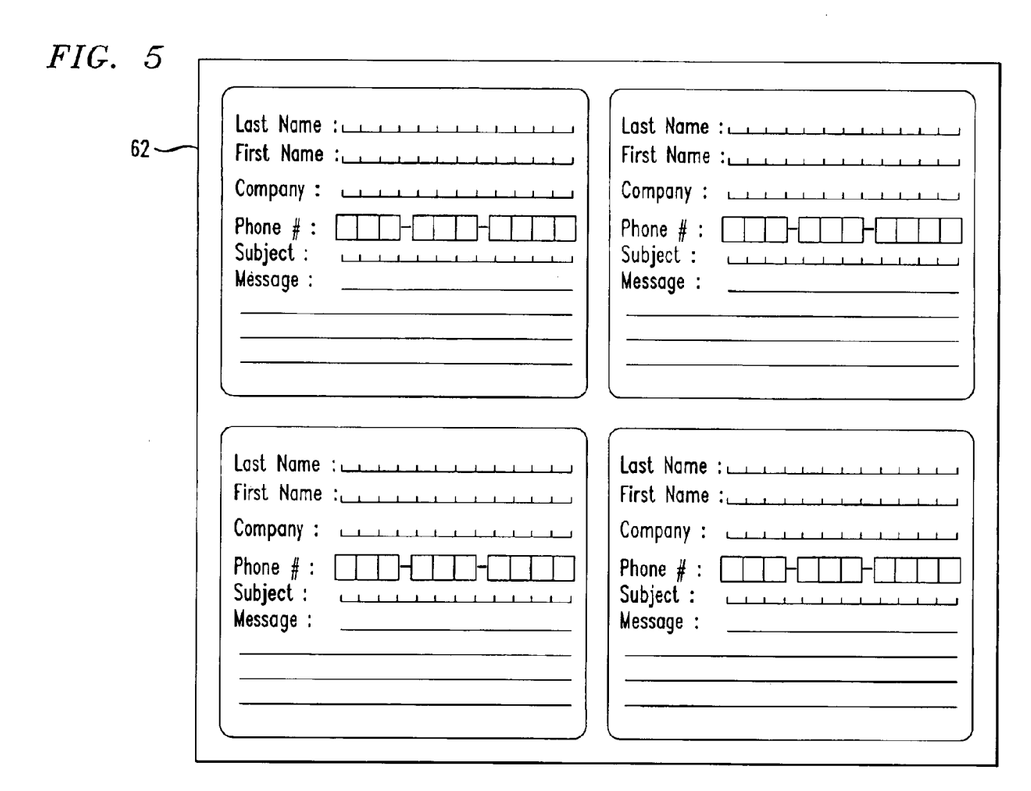
FIG. 5 is a diagram illustrating a phone messages template for use with a template-field entry methodology according to an embodiment of the present invention.
Figure 6:
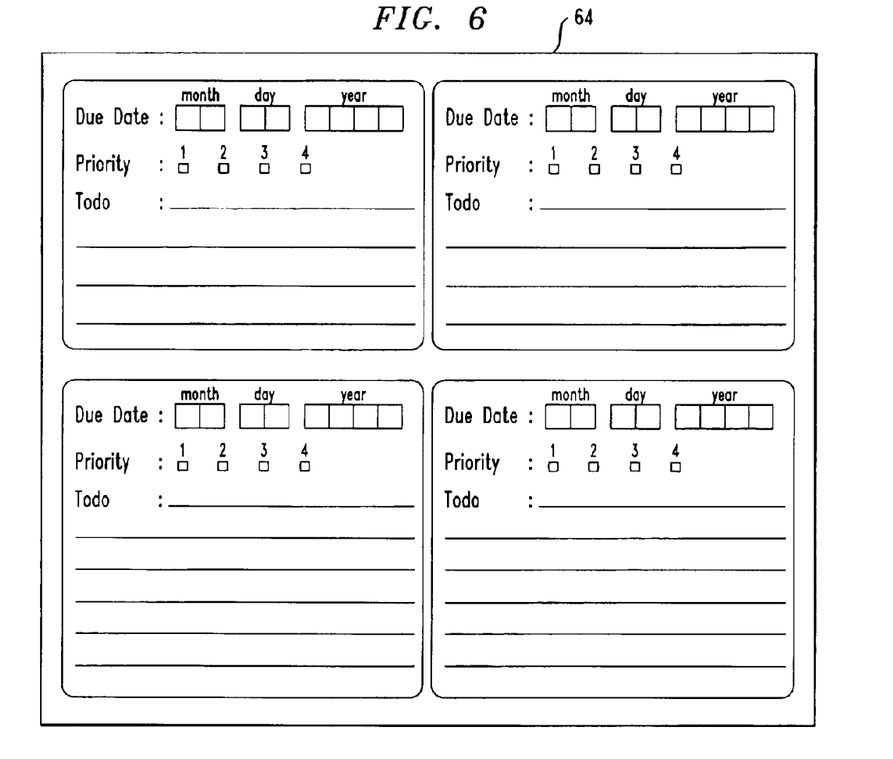
FIG. 6 is a diagram illustrating a todos template for use with a template-field entry methodology according to an embodiment of the present invention.

The template-field entry method allows users to retain one separate hard copy of all Labels of a given type. The user-interface comprises preprinted loose pages (templates) specifying the correct layout of the ink for each type of Label. Examples of such preprinted templates are shown in FIGS. 4–6. Namely, FIG. 4 illustrates an exemplary template 60 for recording appointment information; FIG. 5 illustrates an exemplary template 62 for recording phone message information; and FIG. 6 illustrates an exemplary template 64 for recording information about tasks to be accomplished or so-called "todos." The methodology uses a predefined (and pre-stored) set of Fields for each Label whose page-relative location is specified by a user action on the PDN, but whose location relative to each other in their Field Group is fixed. The layout of the preprinted pages is the same as the layout of the predefined fields and each Label type has its own page type.

Figure 7:
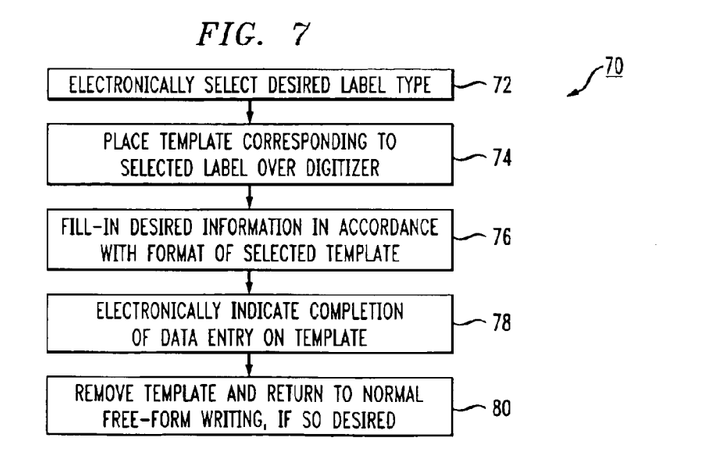
FIG. 7 is a flow diagram illustrating a template-field entry methodology according to an embodiment of the present invention.

Referring now to FIG. 7, a flow diagram illustrates a template-field entry methodology 70 according to an embodiment of the present invention. A user writes normally until such time as he wishes to enter a Label. At that point, the user electronically selects the desired Label type (step 72). He may do this in a number of ways. For example, the user may activate a soft (virtual) button on the PDN to select the desired Label type. This step retrieves and loads the predefined set of Fields associated with the selected Label. Next, the user places the template (e.g., as shown in FIGS. 4–6) corresponding to the selected Label over the digitizing surface of the digitizer (step 74). If the user was "free-form" or "purely-text" writing on a separate piece of paper prior to selecting the Label, he can simply place the template over the current paper. Of course, the template can be placed directly on the digitizing surface of the digitizer. Next, the user uses the preprinted page to enter the formatted ink data (step 76). That is, the user fills-in the desired information on the selected template in accordance with the format on the selected template. Accordingly, the entered information is electronically stored as electronic ink data in the PDN and/or PC, and a hardcopy of the entered information is saved in the form of the preprinted template upon which the user, using the pen device, actually deposited physical ink. Thus, a separate list is created for the desired Label type (appointments, phone messages, todos, etc.). The user then electronically indicates completion (step 78). Again, this may be done in a number of ways. For example, the user may activate a soft button on the PDN to indicate completion of the template.

Further, the act of selecting the desired Label type may also select a target application, and ink entered in step 76 is then sent to that application (e.g., a PIM). Then, there is no need for the user to perform a separate ink selection action. This also has the advantage that the user does not have to position the template page so that the new ink is correctly located on the existing page of ink.

Lastly, the user removes the template and returns to normal writing, if so desired (step 80). It is to be understood that the previously-used template may be subsequently reused if all portions are not completely filled-in.

One rationale for using preprinted forms is that they can be constructed to enforce a particular writing style. For example, users can be instructed to enter the ink in one or more Fields in "all uppercase." In addition, the presence of preprinted boxes (one per character) in one or more Fields will enforce a segmented writing style conducive of good recognition. Finally, since many fields of a form will be for specific types of data (e.g., dates, phone numbers, etc.), recognition accuracy can be improved by enforcing constraints on the contents of individual Fields.

Advantageously, the template-field entry method allows the entry, at different times, of both formatted and unformatted (free-form) electronic ink. This permits the user to switch between the modes of entry in a natural way, by switching between a piece of plain paper (e.g., paper having ruled lines or no lines at all) and one of the preprinted forms (e.g., FIGS. 4, 5 or 6) overlaying the digitizing surface. Thus, both the entry of formatted ink (on the form) and unformatted ink (on the plain paper) are part of the normal writing flow, on a single device. Also, advantageously, the present invention allows users to position the preprinted forms at their convenience, rather than requiring the positioning of the form in one position where the form must cover the entire writing area. As such, the present invention also does not require complex form-alignment actions to be performed when the user places a form on the digitizer.

An additional feature of the present invention which may be employed in accordance with the template-field entry method, e.g., at step 76 of FIG. 7, as well as any of the other applicable methods described herein, is the generation of one or more device-initiated signals (auditory or visible or both) which function as feedback to the user. The one or more feedback signals may indicate, for example, that the user is (or is not) writing within a defined field, that the user has (or has not) completed all required fields, etc. Such data entry format compliance signals may be generated by the PDN 10 and/or PC 20 (FIG. 1) and presented to the user during real-time data entry on one or more of the various output user interfaces associated with the PDN and/or PC, e.g., display (50 in FIG. 3), speaker (not expressly shown in FIG. 3), etc.

B. Implicit-field Entry

Implicit-field entry involves a user-interface comprising preprinted pads or forms specifying the correct layout of the ink for each type of Label. It is to be appreciated that by "pad," we refer to a group of writing media (e.g., a pad of paper) preferably bound together along one edge, possibly but not limited to the top edge, while a "form" may be one page of writing medium (e.g., a page of paper). Thus, a pad may comprise multiple forms. Typically, a pad of forms may have all forms the same, but it is to be understood that a pad may have, for example, a predetermined number of copies of form 'A,' a predetermined number of copies of form 'B,' etc. Nonetheless, in accordance with the implicit-field entry method, the terms "pad" and "form" may sometimes be used interchangeably in the sense that the term "pad" may also be considered as referring to one or more of the forms associated with a pad. Thus, in operation, the pad may be attached to, or suitably positioned with respect to, the PDN such that at least one form substantially overlays the writing surface of the digitizer. The implicit-field entry methodology uses a predefined (and prestored) set of Fields for each Label whose page-relative location is specified by a user action, but whose location relative to each other in their Field Group is fixed. The layout of the preprinted forms of the pad is the same as the layout of the predefined Fields. We describe a preferred preprinted pad and three variations of the preprinted pad, but the present invention is not limited to these examples.

Figure 8:
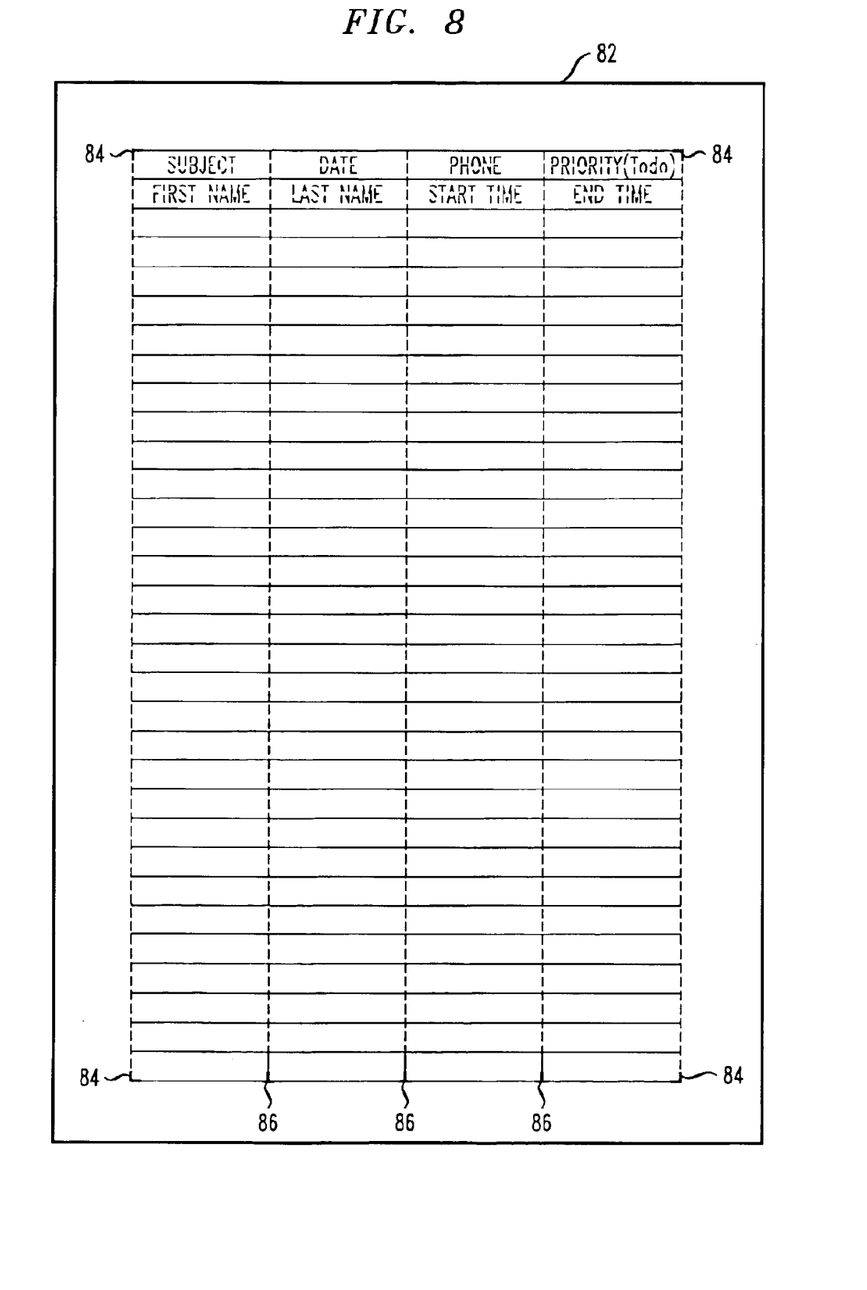
FIG. 8 is a diagram illustrating a preprinted form for use with an implicit-field entry methodology according to an embodiment of the present invention.

FIG. 8 illustrates an example of a preprinted pad or form for use with an implicit-field entry methodology according to an embodiment of the present invention. As shown, the preprinted form 82 has one or more lightly-colored or fine vertical lines ("watermark" lines similar to the light blue line down the left hand side of ordinary 8.5×11 notebook paper or legal pads, or down the middle of most 6×9 steno pads). The form also has (at the top or bottom) lightly-colored or fine column headings, specifying the meaning of each column for the types of Labels to be supported. Further, the form has horizontal lines which are not necessary, but may be helpful. During "ordinary" inking, i.e., free-form or unformatted inking, these columns serve no function (other than possibly guiding the user to write neatly) but, advantageously, do not obtrude. Thus, similar to the template-field entry method described above, this method also permits the user to switch between formatted and unformatted entry modes in a natural way on a single device, as well as yielding other advantages mentioned herein. Also denoted on the form 82 of FIG. 8 are the corners 84 of the preprinted lines and the locations 86 of the column lines. It is to be appreciated that while the forms of the pad are preferably white, the forms may be any color so long as the ink is of a contrasting color.

Figure 9:
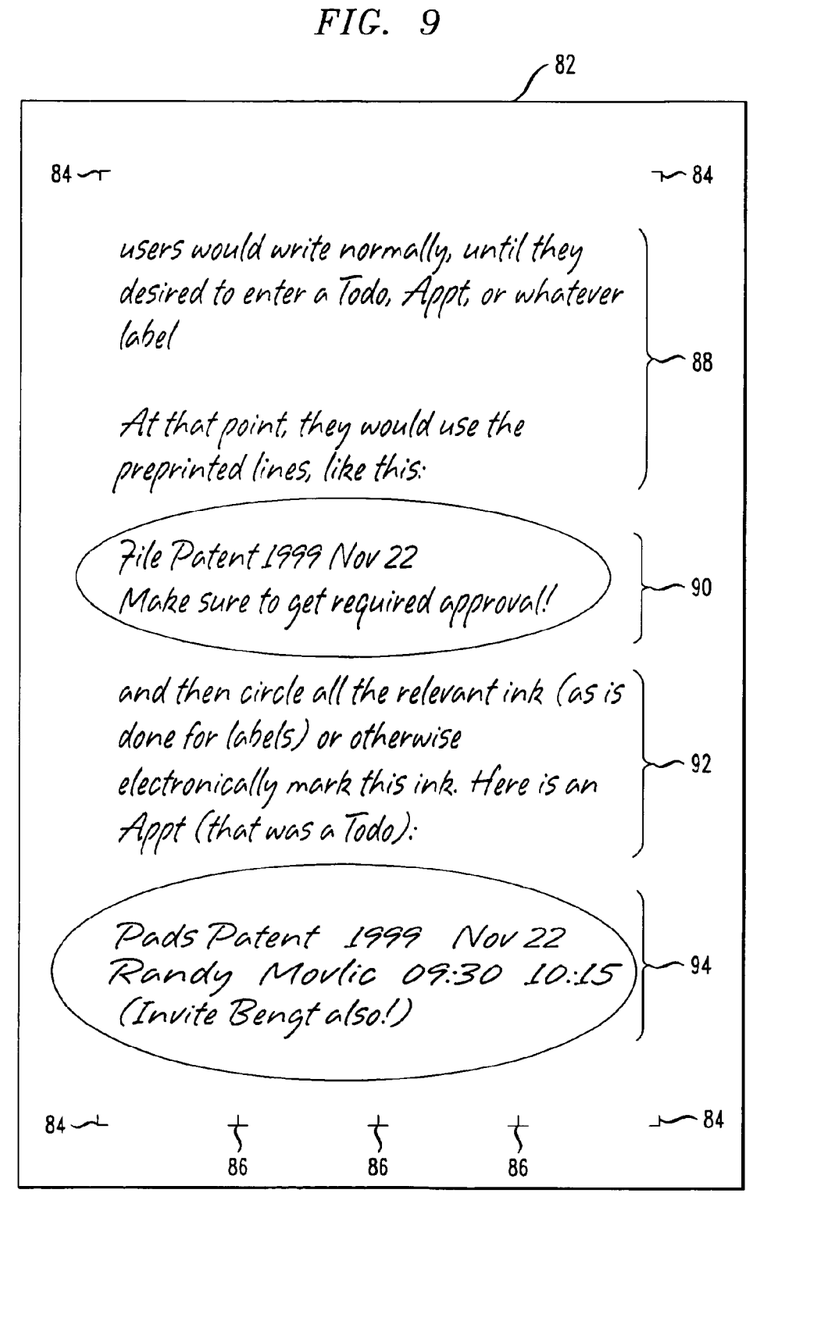
FIG. 9 is a diagram illustrating example ink written on an example preprinted form for use with an implicit-field entry methodology according to an embodiment of the present invention.

Referring now to FIG. 9, a diagram illustrates an example of ink written on the preprinted form 82. Note that the column headings and vertical/horizontal lines are not shown for the sake of clarity. A user writes normally on the form 82, such as denoted in areas 88 and 92 of FIG. 9, until he desires to enter a todo, appointment, or some other Label. At that point, the user selects the type of Label to enter, and uses the preprinted lines to enter just the relevant data (e.g., data to be provided to an application). The relevant data may only take one line, as in the example todo ("File Patent 1999 Nov. 22") denoted within area 90 of FIG. 9. With concurrent reference to FIG. 8, it can be seen that the ink data "File Patent" (FIG. 9) aligns with the "Subject" column (FIG. 8), while the ink data "1999 Nov. 22" (FIG. 9) aligns with the "Date" column (FIG. 8). Alternatively, the relevant data may take two lines, as in the example appointment (first line: "Pads Patent 1999 Nov. 22"; second line: "Randy Moulic 09:30 10:15") denoted within area 94 of FIG. 9. Again, with concurrent reference to FIG. 8, it can be seen that, for the first line, the ink data "Pads Patent" (FIG. 9) aligns with the "Subject" column (FIG. 8), while the ink data "Nov. 22, 1999" (FIG. 9) aligns with the "Date" column (FIG. 8). For the second line, the ink data "Randy" (FIG. 9) aligns with the "First Name" column (FIG. 8), the ink data "Moulic" (FIG. 9) aligns with the "Last Name" column (FIG. 8), the ink data "09:30" (FIG. 9) aligns with the "Start Time" column (FIG. 8) and the ink data "10:15" (FIG. 9) aligns with the "End Time" column (FIG. 8).

In addition, a user can enter "free-form" or "purely-text" ink right below the formatted-ink, as shown in both areas 90 ("Make sure to get required approval!") and 94 ("Invite Bengt also!"). Then, the user can electronically mark all the relevant ink. For example, as illustrated in FIG. 9, this may involve circling the ink. However, any suitable method of indicating a region on the page may be used. When that ink is uploaded to the PC, the ink is recognized and parsed according to the field defined for the selected Label in accordance with the preprinted form (i.e., the fields and the preprinted form must be consistent). Recognition and parsing according to a defined field is known in the art. The proper location of the predefined field on the page is determined by the location of the selected ink. The selection of the type of Label to enter could be made either by pressing a soft (virtual) button, or else simply by checking one of several boxes in the watermark printing.

Since the user writes the ink on the same physical page as the ink immediately preceding and following, the action of selecting the ink is rendered more accurate than if written on a separate sheet (which would have to be accurately positioned), unless using the method of template-field entry as described above in section A.

Three illustrative alternatives to the preprinted form described above are as follows. First, separate preprinted pads of yellow-sticky type notes (e.g., similar to Post-It™ notes from 3M), possibly with a carbon-paper-like backing, may be employed. Second, separate guide-sheets (e.g., printed on cardstock, plastic, or some other suitable material) which serve as guides only may be employed. Third, a reserved section of each page in which only formatted ink should be entered (similar to the layout of many day-timers) may be employed.

In the first case, there is one pad of yellow-sticky notes (i.e., sheets with partial adhesive backing) per Label type, and a user attaches one to the regular writing pad each time he desires to enter a Label, writes on the yellow-sticky note in its preprinted fields, and then circles the entire yellow-sticky note. The carbon-paper-like backing solves the problem of missing ink on the regular writing pad, since the yellow-sticky notes may become detached. In the second case, the user does not enter the ink directly on the guide, but simply uses the selected guide as a model for his writing.

It is to be understood that the guide-sheets and the yellow-sticky notes are each preferably printed exactly as depicted in exemplary FIGS. 4, 5, and 6 (the preprinted forms for template-field entry) except that (a) each sheet of paper in the pad of yellow-sticky notes normally (but not exclusively) has only one copy of the Field Group, while (b) each user normally has and needs to use only one copy of each type of guide-sheet, and each guide-sheet is printed or engraved or otherwise inscribed upon some durable material such as plastic or cardstock. If some other Field-Group format is designed for use in the template-field entry method, it is always the case that the exact same layout could be used on either a yellow-sticky pad or a guide-sheet for use in this method; and vice versa, if some other Field-Group format is designed for use in this method, it is always the case that the exact same layout could be used on the preprinted sheets for use in the template-field entry method.

Figure 10:
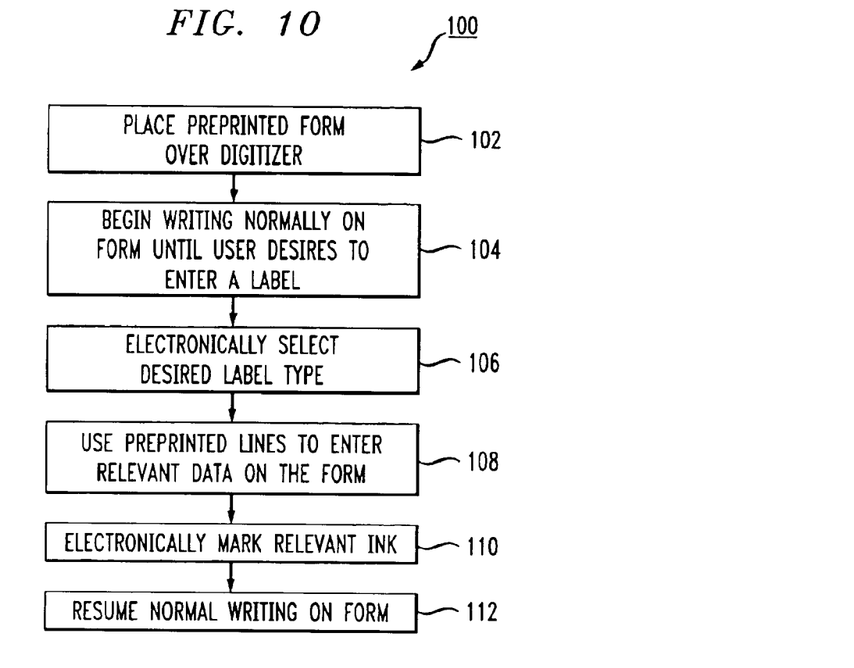
FIG. 10 is a flow diagram illustrating an implicit-field entry methodology according to an embodiment of the present invention.

Referring now to FIG. 10, a flow diagram is shown summarizing the steps, as explained above, of an implicit-field entry methodology 100 according to an embodiment of the present invention. The user places the preprinted form (e.g., as shown in FIG. 8) over the digitizing surface of the digitizer (step 102). He begins writing normally, e.g., free-form or purely-text, on the form until he desires to enter a particular Label type, e.g., todos, appointments, etc. (step 104). The user then electronically selects the desired Label type (step 106), as explained above. Then, using the preprinted lines, the user enters the relevant information associated with the Label type in correspondence with the column headings on the form (step 108). After entering the relevant data, the user then indicates completion of the particular entry by marking the relevant data (step 110). This may be done, for example, by circling the relevant data. Then, the user may resume normal writing on the preprinted pad form (step 112).

C. User-delineated-field Entry

Figure 11:
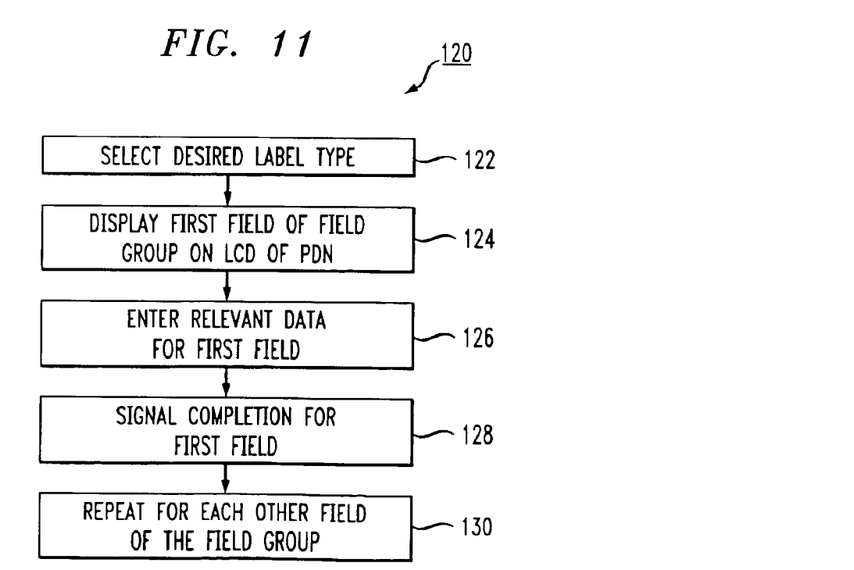
FIG. 11 is a flow diagram illustrating a user-delineated-field entry methodology according to an embodiment of the present invention.

User-delineated-field entry allows users to delineate the ink data for each Field in a Field Group. Instead of pre-defined Fields (as in the template-field and implicit-field methods), this user interface allows users to signal the beginning and end of each portion of ink which is to be individually parsed (e.g., "date" and "time" in an Appointment). In this method, the definition of each Field Group is loaded into the PDN (rather than onto preprinted pads or sheets). FIG. 11 illustrates a flow diagram of a user-delineated-field entry methodology 120 according to an embodiment of the present invention. First, the user electronically selects the desired Label type (step 122). A liquid crystal display (LCD) or other device on the PDN then indicates the first Field in the Field Group (step 124). The user enters ink (step 126) and then signals completion for the current Field (step 128). A user interface may also be provided to allow a user to randomly select Fields of the Field Group, for greater flexibility and to allow users to amend their ink. The above process is repeated until the user signals completion for the last Field of the Field Group (step 130). Ink strokes are assigned to the Field for which the user was prompted when the ink was written. It is to be understood that this method does not require preprinted forms, nor does it require the user to write in any pre-specified locations.

It is to be understood that the user-indication of the Field is provided through the type of user-interface described above. That is, a user-interface, either on the PDN or on the PC, appears when the user first signals that they want to enter ink data according to this embodiment of the present invention. Once the user has selected (in any of several ways known to the art, such as from a menu or a combo-box) the desired Field Group, the same user-interface then either presents the set of Fields belonging to the selected Field Group in a predefined order, allowing the user to select or skip each one before presenting the next one, or else it presents the entire set of Fields in the selected Field Group so that the user can select any one of them at any time ("randomly"), again in any of several ways known to the art. These two modes of presentation are to be considered exemplary, and any other interface which presents the Fields of the Field Group in an appropriate and useful order and manner could also be used. Once the user, by any of these or other similar methods, has specified a given Field, any ink entered would be assigned to that Field and processed accordingly, until the user selects another Field of the Field Group or else signals completion of the Field Group.

D. Tagged-field Entry

Figure 12:
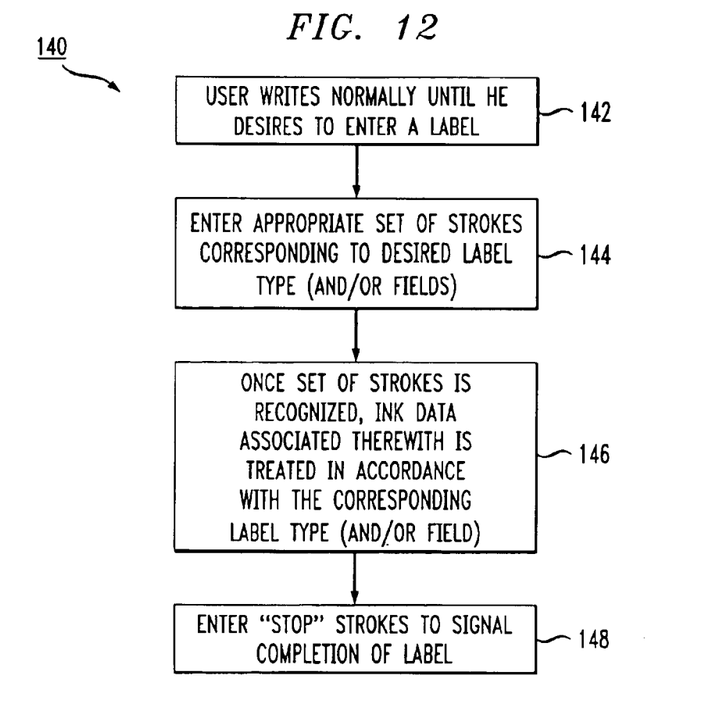
FIG. 12 is a flow diagram illustrating a tagged-field entry methodology according to an embodiment of the present invention.

Tagged-field entry allows users to tag each predefined Label type with its own letter, symbol, or word, and also then to tag each Field of that Label with its associated symbol or word. FIG. 12 is a flow diagram illustrating a tagged-field entry methodology 140 according to an embodiment of the present invention. A user writes normally, until he desires to enter a todo, appointment, or some other Label (step 142). At that point, the user enters the appropriate set of strokes (some predefined stroke design or symbol which is reliably recognized) for the Label he wishes to enter (step 144). The symbols may be either unique (and hence writable anywhere) or else standard but written only in a designated zone (e.g., the left-most 2 centimeters of the page). Whenever this ink is processed, and that symbol recognized, the ink specified by that symbol is treated as a Label of the specified type (step 146). Similarly, this may be done for the individual Fields of the Label, each of which has its own associated symbol (e.g., an hourglass for "time"). Completion of the Label may then be signaled by a "stop" symbol, such as a line drawn all the way across the page, or in a variety of other ways (step 148).

E. User-specified Field Groupings

Generation of user-specified field groupings is a method for improving any method for the entry of formatted ink data. It allows the user to improve the usability of any method for the entry of formatted ink data by specializing it, since users may have requirements for the Fields of the Field Group entry.

Figure 13:
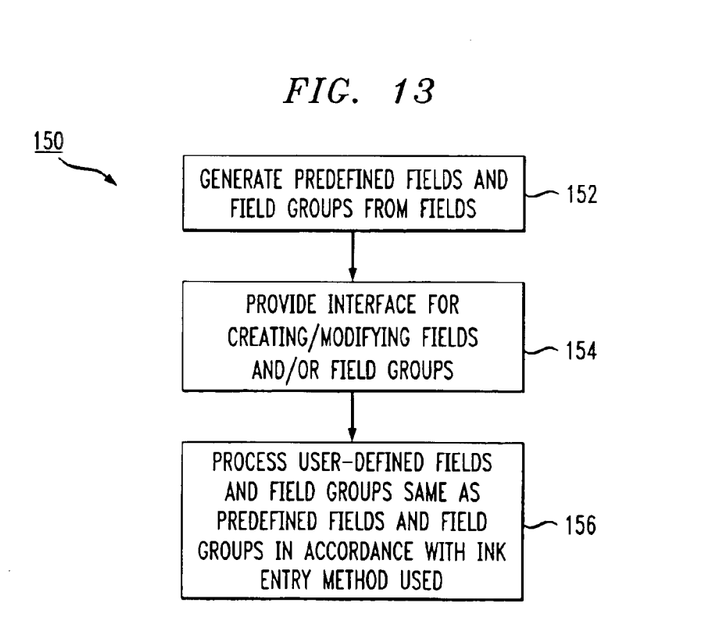
FIG. 13 is a flow diagram illustrating a user-specified field groupings methodology according to an embodiment of the present invention.

Referring now to FIG. 13, a flow diagram illustrates a user-specified field groupings methodology 150 according to an embodiment of the present invention. A set of Fields, and based on those, a set of Field Groups, are defined (step 152), as in any of the methods above or by any similar method. Then, an interface (for example, a wizard-type graphical user interface preferably implemented on the PC, but can alternatively be implemented on the PDN) is provided to allow users to create their own Field Groups from the predefined Fields, and to modify existing Field Groups, possibly including, but not limited to, the predefined Field Groups (step 154). The resulting user-defined Field Groups are processed (parsed and recognized) exactly as the predefined ones are, i.e., according to whichever ink entry method is being used (step 156).

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. A method of entering formatted electronic ink data provided in association with a user on a handwriting system, the method comprising the steps of:

positioning one or more pieces of writing medium to substantially overlay at least a portion of a digitizing surface associated with the handwriting system;

physically entering handwritten data on the one or more pieces of writing medium using a stylus associated with the handwriting system such that, substantially simultaneous therewith, the electronic ink data representing the physically entered handwritten data is entered at the digitizing surface;

wherein the one or more pieces of writing medium are configured to have a predefined format including one or more fields associated with the predefined format such that the electronic ink data entered at the digitizing surface is computer-parseable based on the one or more fields, and further wherein a field comprises a delimited area of the writing medium; and providing one or more user-specified indications to indicate that electronic ink data entered in association with the one or more user-specified indications is to be associated with the one or more fields, so as to permit a transition between the entry of electronic ink data in accordance with the one or more fields and entry of electronic ink data that is not associated with the one or more fields.

2. The method of claim 1, wherein at least one of the pieces of writing medium has the predefined format for entry of electronic ink data in accordance with the one or more fields and at least one of the pieces of writing medium does not have the predefined formats such that the user may transition between the two pieces of writing medium when performing formatted electronic ink data entry and unformatted electronic ink data entry, respectively.

3. The method of claim 1, wherein the one or more fields of the one or more pieces of writing medium are preprinted in watermark form thereon, such that the user may transition between performing formatted electronic ink data entry and unformatted electronic ink data entry on the same piece of writing medium.

4. The method of claim 1, wherein the one or more fields of the predefined format are associated with a label.

5. The method of claim 4, wherein the label is associated with an information management function.

6. The method of claim 5, wherein the information management function comprises at least one of an appointment recording function, a phone message recording function and a listing function of tasks to be accomplished.

7. The method of claim 1, wherein the user-specified indication providing step further comprises the step of the user signaling the beginning of entry of formatted electronic ink data in accordance with the one or more fields.

8. The method of claim 1, wherein the user-specified indication providing step further comprises the step of the user signaling completion of entry of formatted electronic ink data in accordance with the one or more fields.

9. The method of claim 1, further comprising the step of providing the user with feedback relating to the user's entry of formatted electronic ink data in accordance with the one or more fields.

10. The method of claim 9, wherein the feedback is at least one of auditory and visible.

11. The method of claim 9, wherein the feedback relates to whether or not the user is writing within one of the fields.

12. The method of claim 9, wherein the feedback relates to whether or not the user has completed one or more required fields.

13. The method of claim 1, wherein the handwriting system is a personal digital notepad.

14. The method of claim 1, wherein the one or more pieces of writing medium are bound together to form a grouping.

15. The method of claim 1, wherein at least one of the pieces of writing medium has a carbon paper backing.

16. The method of claim 1, wherein at least one of the pieces of writing medium has an at least partially adhesive backing.

17. The method of claim 1, wherein at least one of the pieces of writing medium has the predefined format on only a portion of the writing medium.

18. A method of entering formatted electronic ink data provided in association with a user on a handwriting system, the method comprising the steps of:

positioning one or more pieces of writing medium to substantially overlay at least a portion of a digitizing surface associated with the handwriting system;

physically entering handwritten data on the one or more pieces of writing medium using a stylus associated with the handwriting system such that, substantially simultaneous therewith, the electronic ink data representing the physically entered handwritten data is entered at the digitizing surface; and providing one or more user-specified indications to indicate that electronic ink data entered in association with the one or more user-specified indications is to be associated with one or more fields of a predefined format, wherein a field comprises a delimited area of the writing medium, such that the electronic ink data entered in association therewith at the digitizing surface is computer-parseable based on the one or more fields, and such as to permit a transition between the entry of electronic ink data in accordance with the one or more fields and entry of electronic ink data that is not associated with the one or more fields.

19. The method of claim 18, wherein at least one of the user-specified indications comprises at least one of a letter, a symbol and a word.

20. The method of claim 18, wherein at least one of the user-specified indications comprises at least one handwritten stroke.

21. The method of claim 18, further comprising the step of permitting at least one of user addition, deletion and modification of one or more fields.

22. A handwriting system for entering formatted electronic ink data provided in association with a user, the system comprising:

a digitizing surface;

a stylus; and one or more pieces of writing medium;

wherein the one or more pieces of writing medium are positioned to substantially overlay at least a portion of the digitizing surface such that handwritten data can be physically entered on the one or more pieces of writing medium using the stylus such that, substantially simultaneous therewith, the electronic ink data representing the physically entered handwritten data is entered at the digitizing surface;

further wherein the one or more pieces of writing medium are configured to have a predefined format including one or more fields associated with the predefined format such that the electronic ink data entered at the digitizing surface is computer-parseable based on the one or more fields, wherein a field comprises a delimited area of the writing medium, such that one or more user-specified indications can be provided to indicate that electronic ink data entered in association with the one or more user-specified indications is to be associated with the one or more fields, so as to permit a transition between the entry of electronic ink data in accordance with the one or more fields and entry of electronic ink data that is not associated with the one or more fields.

23. The system of claim 22, wherein at least one of the pieces of writing medium has the predefined format for entry of electronic ink data in accordance with the one or more fields and at least one of the pieces of writing medium does not have the predefined format, such that the user may transition between the two pieces of writing medium when performing formatted electronic ink data entry and unformatted electronic ink data entry, respectively.

24. The system of claim 22, wherein the one or more fields of the one or more pieces of writing medium are preprinted in watermark form thereon, such that the user may transition between performing formatted electronic ink data entry and unformatted electronic ink data entry on the same piece of writing medium.

25. The system of claim 22, wherein the one or more fields of the predefined format are associated with a label.

26. The system of claim 25, wherein the label is associated with an information management function.

27. The system of claim 26, wherein the information management function comprises at least one of an appointment recording function, a phone message recording function and a listing function of tasks to be accomplished.

28. The system of claim 22, wherein, in accordance with the one or more user-specified indications, the system is further operative to permit the user to signal the beginning of entry of formatted electronic ink data in accordance with the one or more fields.

29. The system of claim 22, wherein, in accordance with the one or more user-specified indications, the system is further operative to permit the user to signal completion of entry of formatted electronic ink data in accordance with the one or more fields.

30. The system of claim 22, wherein the system is further operative to provide the user with feedback relating to the user's entry of formatted electronic ink data in accordance with the one or more fields.

31. The system of claim 30, wherein the feedback is at least one of auditory and visible.

32. The system of claim 30, wherein the feedback relates to whether or not the user is writing within one of the fields.

33. The system of claim 30, wherein the feedback relates to whether or not the user has completed one or more required fields.

34. The system of claim 22, wherein the handwriting system is a personal digital notepad.

35. The system of claim 22, wherein the one or more pieces of writing medium are bound together to form a grouping.

36. The system of claim 22, wherein at least one of the pieces of writing medium has a carbon paper backing.

37. The system of claim 22, wherein at least one of the pieces of writing medium has an at least partially adhesive backing.

38. The system of claim 22, wherein at least one of the pieces of writing medium has the predefined format on only a portion of the writing medium.

39. A handwriting system for entering formatted electronic ink data provided in association with a user, the system comprising:

a digitizing surface;

a stylus; and one or more pieces of writing medium;

wherein the one or more pieces of writing medium are positioned to substantially overlay at least a portion of the digitizing surface such that handwritten data can be physically entered on the one or more pieces of writing medium using the stylus such that, substantially simultaneous therewith, the electronic ink data representing the physically entered handwritten data is entered at the digitizing surface;

further wherein one or more user-specified indications can be provided to indicate that electronic ink data entered in association with the one or more user-specified indications is to be associated with one or more fields of a predefined format, wherein a field comprises a delimited area of the writing medium, such that the electronic ink data entered in association therewith at the digitizing surface is computer-parseable based on the one or more fields, and such as to permit a transition between the entry of electronic ink data in accordance with the one or more fields and entry of electronic ink data that is not associated with the one or more fields.

40. The system of claim 39, wherein at least one of the user-specified indications comprises at least one of a letter, a symbol and a word.

41. The system of claim 39, wherein at least one of the user-specified indications comprises at least one handwritten stroke.

42. The system of claim 39, wherein the system is further operative to permit at least one of user addition, deletion and modification of one or more fields.

* * * * *